April 28, 1925.    1,536,007
F. W. HUBER
METHOD FOR LOCATING WATER BEARING STRATA IN BORE HOLES
Filed March 29, 1924    2 Sheets-Sheet 1
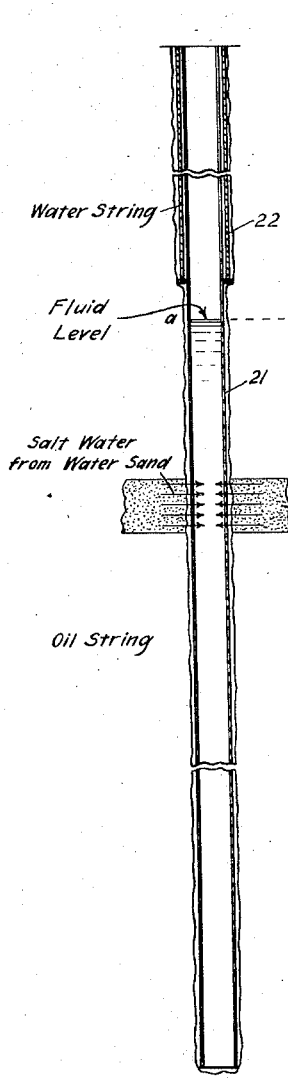
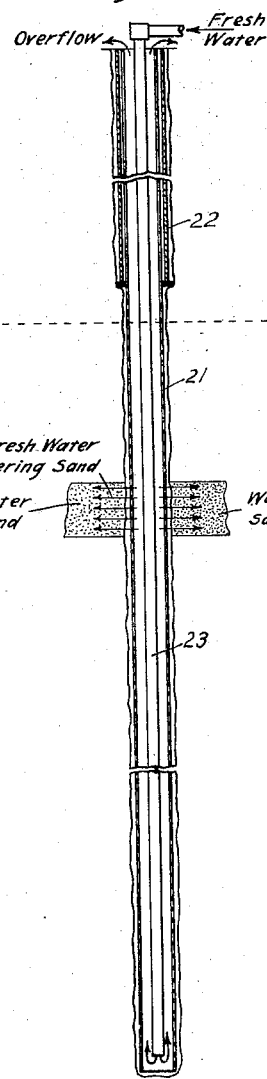
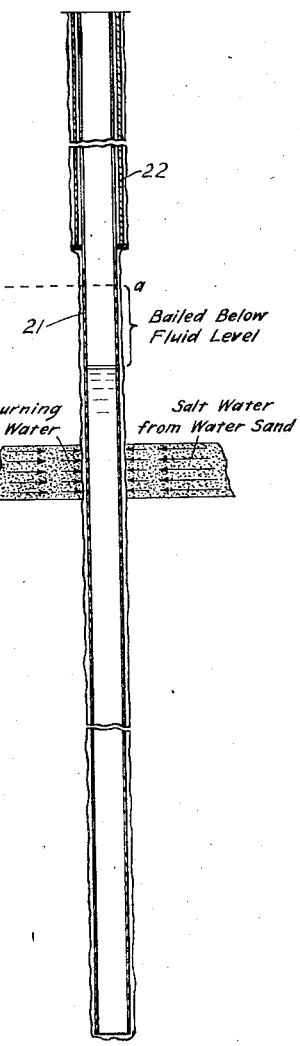
INVENTOR
Frederick W. Huber
BY
Arthur P. Knight
ATTORNEY

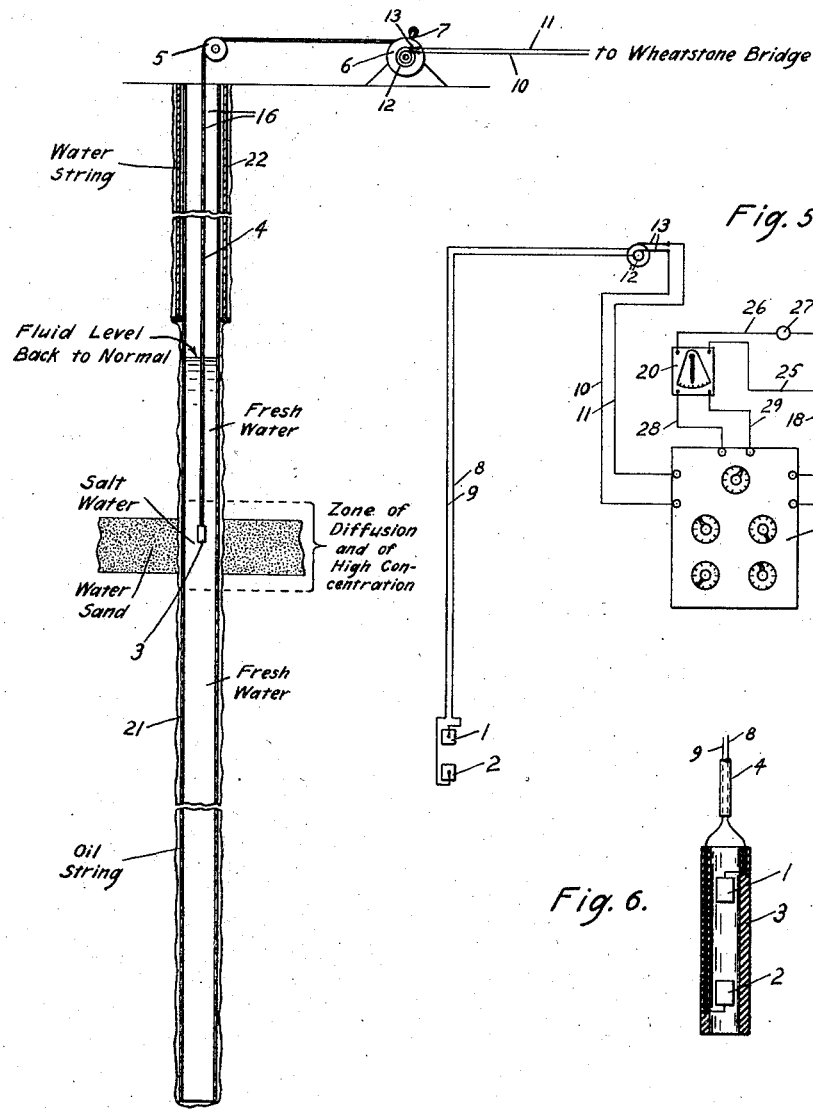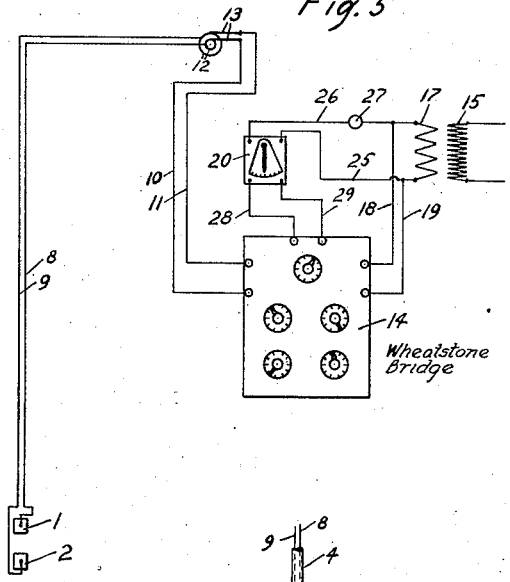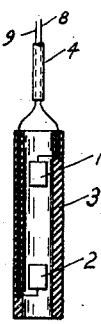

Patented Apr. 28, 1925.

1,536,007

UNITED STATES PATENT OFFICE.

FREDERICK W. HUBER, OF RIVERSIDE, CALIFORNIA.

METHOD FOR LOCATING WATER-BEARING STRATA IN BORE HOLES.

Application filed March 29, 1924. Serial No. 702,946.

*To all whom it may concern:*

Be it known that I, FREDERICK W. HUBER, a citizen of the United States, residing at Riverside, in the county of Riverside, State of California, have invented a new and useful Method for Locating Water-Bearing Strata in Bore Holes, of which the following is a specification.

This invention relates to a method for locating water bearing strata in bore holes in oil or gas bearing formations and the main object of the invention is to provide a means and method whereby the location of such water bearing strata may be positively determined.

In boring wells for oil or gas production, considerable difficulty has arisen from the presence of water bearing strata encountered in the course of drilling or boring of such wells. In order to provide for effective production of petroleum from such wells it is necessary to prevent entrance of water from the water bearing strata to the well casing, this generally being provided for by cementing off the well in an appropriate manner as well understood in the art. In order to provide for effective cementing off of water from the well it is necessary to determine in the first place the location of the water bearing strata and this has been a matter of considerable difficulty, particularly where the wells are drilled or bored in such manner that the bore is filled or partly filled with water or mud during the drilling operation. Under such circumstances and indeed under any circumstances as have heretofore existed, the determination of water bearing strata has been a matter of great difficulty, expense, and uncertainty. My invention obviates this difficulty by providing for positive determination of the location of water bearing strata by the method hereinafter set forth, said method (in its preferred form) being based upon the measurement of electrical conductivity of the liquid in the well, at various levels, under specified conditions.

In carrying out my method I provide for establishing within the bore hole, a column of liquid presenting a sharp difference in concentration at those portions opposite a water bearing strata as compared with the rest of the liquid in the hole, and I further provide means for measuring the electrical conductivity of the liquid at different parts of the said column of liquid in the hole thereby determining the location of the water bearing strata.

The oil bearing zones in an oil field consist, usually, of alternating strata of oil sand and impermeable shale or clay and sometimes intermediate sands which carry saline water. The oil in the oil bearing sand has at its base a very saline body of water known geologically as "edge water."

If an oil or gas bore is made and the water bearing sand is not sealed off it will allow the water to enter the oil sand and crowd the oil away from the bore and it will be difficult to make the well produce. If production can be obtained the oil will be mixed with water and will have to be de-emulsified.

On the other hand supposing there is no intermediate water sand and the well is on production: As the oil is drawn from say one or more sands of the series the edge water will come nearer and nearer the bore until finally it will enter the bore and inundate the oil sands and the production will cease. This case illustrates the problem of a great many oil fields which have been developed too intensely. The locating of the strata making the difficulty constitutes one of the most serious problems in the oil industry.

The oil bearing zone is sealed off from the superficial barren formation by a string of casing called the "water string" which is generally cemented into place. The oil zone is cased with a string of perforated pipe called the "oil string" to hold the bore walls up. When water breaks into a bore hole it fills the hole with saline water up to a point where the column of fluid in the bore hole balances the head (or hydrostatic pressure) of the water in the sands. This point is called "the normal fluid level." The water standing in the hole under these conditions is very saline and is in static equilibrium with respect to the water in the sand. It is preferable to determine this "normal fluid level" of the well, at the outset.

In order to determine the location of the water bearing strata according to my invention it is first necessary to produce a sharp difference in concentration opposite the sand supplying the water or the point of ingress of the water and the rest of the water column in the hole. I insert a string of tubing into the bore hole extending from top to bottom, connect this tubing with a fresh water supply and pump the fresh water down into the bore until it flows over the top of the hole and until the saline water is displaced by the fresh water. The tubing is now withdrawn from the bore hole and the level of the liquid in the bore hole is then lowered by bailing a sufficient distance to allow the fresh water which has been backed into the water sand (by pressure of the water so run in) to come back into the bore hole and further to allow the saline water to enter the hole. This produces opposite the water sand or point of ingress a zone of very saline water with respect to the rest of the water column. This zone opposite the point of ingress I then locate with accuracy by running into the hole on a properly insulated conductor cable a special electrode means, and reading the resistance for each depth interval, for example, by balancing the solution resistance on a Wheatstone bridge. The readings are recorded and opposite the water sand a sharp decrease in resistance is noted. By plotting the resistance against the depth, a curve is obtained which throws these differences into conspicuous relief.

The accompanying drawings illustrate the method and means by which my process may be carried out and referring thereto:

Fig. 1 is a diagrammatic section of a bore hole in condition for application of my invention thereto, showing the normal "fluid level."

Fig. 2 is a diagrammatic section of the bore hole showing means for introducing fresh water in the bore hole for the purpose hereinafter set forth.

Fig. 3 is a diagrammatic section of the bore hole showing a further step in the operation of my method in which the level of the liquid in the bore hole has been lowered below the normal fluid level sufficiently to provide for inflow from the surrounding strata to withdraw from such strata any fresh water which has entered the same from the bore hole during the preceding operation.

Fig. 4 is a diagrammatic vertical section of the bore hole with a column of liquid therein in suitable condition for measurement and with the measuring appliance in position for determining the location of the water bearing strata.

Fig. 5 is a diagram of the circuit connections for the measuring appliances.

Fig. 6 is a vertical section of the electrode means for applying the measuring electric potential to any part of the column of liquid in the bore hole.

In order that my method of locating water bearing strata in bore holes may be properly understood I will first describe certain apparatus or appliances used in connection therewith, in the preferred mode of execution of the process, such appliances being shown in Figs. 4, 5, and 6. The purpose of these appliances is to measure the conductivity of different parts of a liquid column established in the bore hole as hereinafter described and such appliances include electrode means adapted to be exposed in contact with such liquid and means for positioning said electrode means at different heights in the bore hole, circuit means, including a source of current for applying a definite electrical potential difference to said electrodes and means for measuring the current in such circuit means and thereby determining the resistance and hence the concentration of the liquid present between the said electrodes.

The electrodes indicated at 1 and 2 may be mounted in any suitable manner for example within a cylinder 3 which may be of insulating material, the electrodes in any case being insulated from one another and being mounted at a definite distance apart and the said cylinder being open, and preferably open at both ends, so as to allow free access of liquid to said electrodes. The electrodes 1 and 2 and their supporting and enclosing means 3 are mounted on any suitable flexible suspension means such as a cable 4 which passes over suitable sheave 5 at the top of the bore and is connected to suitable means such as a reel 6 having suitable means such as handle 7 for operating the same to wind the cable on the reel or to unwind it therefrom, to cause ascent or descent of the electrode means in the bore hole. Said cable may be provided with markers 16 whereby it is marked off into convenient lengths for measuring the depth at which the electrode means is located at any particular instant of time or any other suitable means may be provided for indicating such depth. Electric circuit wires indicated at 8 and 9 are connected to the respective electrodes 1 and 2 and may form a part of the cable (said cable for example comprising two heavily insulated wires or conductors which are encased in a heavily insulated sheath) or may be connected thereto, said cable and wires being of sufficient length to permit the electrode means to be lowered to any part of a bore hole and to maintain electric connection with the electrodes in all operative positions thereof. Said wires 8 and 9 are connected at their upper ends to wires 10 and 11 forming a part of the electrical measuring circuit as hereinafter described, the connection for the respective wires 8 and 9 and 10 and 11 being, for example, by means of collector rings 12 and brushes 13, so as to admit operation of the reel 6 in raising or lowering the electrode means while maintaining such electric connection. Any suitable circuit means may be provided for applying the electric current or potential to the wires leading to the electrodes so as to measure the resistance of the medium presented between the electrodes, for example, as shown in Fig. 5, said electric measuring means may comprise a Wheatstone bridge 14 of usual construction, and a source of current or electric potential connected thereto and to the circuit wires 10 and 11. It is essential to the present invention that alternating current should be used in measuring the electrical resistance so as to avoid errors which would result from polarization in case direct current were used, and it is also important that no ground connections should be present, and in order to satisfy these requirements I prefer to use as a source of current a transformer whose primary winding 15 is connected to any suitable alternating current supply circuit, either single phase or poly-phase, and whose secondary winding 17 is connected by wires 18 and 19 to opposite terminals of the Wheatstone bridge 14. The intermediate terminals of the Wheatstone bridge are connected in the usual manner to a null point indicator 20 which is of a type adapted for operation by alternating current. The transformer used may be of the iron core type, transforming for example from 110 to 6 volts, the latter voltage being applied to the wires leading to the electrode means.

In order that the electrode means shall operate effectively under the conditions existing in the column of liquid in the test operation as hereinafter set forth it is necessary that the surface of the electrodes which are in contact with the liquid not be wetted by oil but only by water and saline solutions. For this purpose I have found it desirable to coat the surface of the metal body or conductors forming the electrodes with a gelatinous substance and I have found that either gelatinous silica or agar may be used advantageously for this purpose. The gelatinous silica is however only applicable to platinum or gold electrodes or to their acid resisting alloys. To coat such an electrode I allow water glass of about 1.15 sp. gr. to harden in a thin film upon the electrode and then immerse it in a very dilute solution of mineral acid, which in the course of a few hours will form a gelatinous coating of silicic acid. This is then washed free of electrolytes and kept in a water saturated atmosphere until ready for use.

With the baser metals such as nickel (which I prefer to use in actual field work) I simply coat the cleaned electrode surface with a thin film of agar dissolved (dispersed) in hot distilled water, by dipping the electrode in the agar infusion and allowing to set, repeating the dipping and setting until a uniform and thin film is obtained over the entire electrode surface. The electrode after the agar has set is kept in water until ready for use. It is also of advantage to first cover the cleaned electrode with a fine cambric cloth and then saturate this cloth with hot agar infusion and build up on this covering a fine glaze of set agar. It is also of advantage, for particularly severe usage, to harden the agar by a hardening agent such as formaldehyde or alum. But this is generally not necessary.

A cambric covered agar coated set of electrodes I have found to be in excellent mechanical and electrical condition after making six round trips to the bottom of a 5000 foot bore hole.

The electrodes so coated with the oil repelling film, give in the laboratory when tested against uncoated electrodes practically the same readings instantly. That is it takes but an instant for the electrolyte or rather the ions to penetrate the film.

As a practical illustration of the application of my invention for locating the position in a bore hole of the point of ingress of saline water I proceed as follows:

The "normal fluid level" as described above is preferably first determined. In Fig. 1 this level is indicated by the line $a$—$a$, the "oil string" of the well casing being indicated at 21 and the "water string" at 22. The hole is then conditioned by circulating through a string of tubing indicated at 23 in Fig. 2 reaching from top to bottom of the bore hole a supply of fresh water until it flows freely out of the top of the casing and until all of original fluid of the hole is displaced. The tubing 23 is then removed from the hole and the water is bailed down to the original "fluid level" indicated by line $a$—$a$ and bailing continued below this level for a distance of say one hundred feet as shown in Fig. 3 to throw the column of water out of balance and to permit the fresh water which has backed into the saline water sand to reenter the hole and to allow saline water behind it to come into the hole and again balance the water column. Under these conditions there will be opposite each point of ingress of saline water a zone or column of water whose salinity is decidedly greater than the balance of the water in the hole. The properly connected electrode means as shown in Fig. 6 is now lowered by means of the reel 6 into the hole as shown in Fig. 4 and the resistance is kept balanced for each space interval as indicated by the markers 16, the value of this resistance is recorded and this operation is continued until the bottom of the hole is reached. On pulling out reverse readings are taken at the various points as a check. These results are plotted against the depth. The resulting curve will show strong points of inflection opposite the points of ingress of the saline water.

In practice I have been able to locate three sands (in a given hole) of different heads, and have been able to make the location of one which was indicated less strongly than the other two by bailing to a lower level thus allowing the head in the sand to make itself felt to a greater degree.

To carry out the invention most effectively the following conditions should be observed:

First, the bore hole must be conditioned so as to produce a sharp difference in concentration between the water or fluid opposite the water bearing strata and the rest of the water or fluid in the hole.

Second, the electrodes used for measuring the resistance must be so prepared and treated that they will not be wet by oil or oil-water emulsions but only by water and saline solutions.

Third, the current used for such measurements should preferably be alternating to prevent the electrolysis of the saline solution with its possible resulting polarization which would give erroneous values for the resistance measurements.

Fourth, the current used (alternating) must originate in such a manner that the circuit for measuring the resistance will at all times be free from an electrical ground to the bore hole casing.

In regard to the requirement above stated as to the nature of the electrode surfaces that are exposed to the liquid, it may be pointed out that the column of fluid standing in the hole has at its top a layer of oil or oil-water emulsion varying from a few feet to several hundred feet in depth and below this to the bottom of the hole there will inevitably be patches of oil or oil saturated gas, which enter the bore hole. These substances adhere most tenaciously to all metals known to me that could be used for electrodes and would prevent the accurate reading of the resistance between the electrodes. This was found to be a serious difficulty in the early attempts at operation of the process. Encasing the electrode in an ordinary filter medium was found to be useless in that the filter became coated with oil and clogged up immediately on coming in contact with it. I have found however that the principle of adsorption offers a solution to this all important problem, and by coating the electrode as above described with a thin film of gelatinous material which would not be wetted by oil but only by water and saline solutions, this difficulty was overcome.

The sharp difference in saline concentration at parts of the liquid column opposite a water bearing stratum is obtained by first establishing in the bore hole a column of fresh water, (that is water of less saline concentration than the water solution in the water bearing stratum), then lowering the level of the water in the hole sufficiently to cause inflow of water to the hole from the surrounding strata, the first effect of which is to return to the bore hole any fresh water that may have entered the surrounding strata and to draw the saline solution in any water bearing stratum into contact with the liquid column in the hole, and to then cause inflow and diffusion of saline solution into the column of fresh water in the hole, from such water bearing stratum, the inflow being due to the head represented by the depression of the liquid column below the "fluid level" for the bore hole, and the diffusion being due to the difference in saline concentration between the water solution in the water bearing stratum and the fresh water column. It will be understood that this condition is a temporary one, such condition of concentration and head tending to become eventually balanced and that the required conductivity measurements must be carried out while the unbalanced condition of concentration persists. Having thus established a zone of relatively high saline concentration at a part of the liquid column opposite a water bearing stratum, I determine the location of such zone by determining the saline concentration at different parts of the column for example by determining the specific electrical conductivity at such different parts, as above described.

The form of measuring instrument shown, namely, a Wheatstone bridge with null point indicator 20 responsive to alternating circuit, is especially adapted for the purpose. Said null point indicator may be provided with energizing circuit connections 25 and 26 including resistance or lamp 27, and connected to secondary winding 17 and to a coil of the indicator 20, to produce a magnetic field which operates upon a coil connected by circuit arms 28 and 29 to the intermediate terminals of the Wheatstone bridge in the usual manner of such alternating current measuring means. Any other electrical measuring means, responsive to alternating current may, however, be used.

What I claim is:

1. The method of determining the location of water bearing strata in bore holes which consists in supplying to the bore hole water presenting less saline concentration than the solution in the water bearing strata so that diffusion from the water bearing strata will establish a zone of relatively high saline concentration in the column of liquid in the bore hole opposite a water bearing stratum and then measuring the electrical conductivity of the liquid in situ at different parts of said column to determine the location of any part thereof presenting such relatively high saline concentration, while preventing fouling of the electrical measuring means by oil, and while employing alternating current in said measuring operation.

2. The method of determining the location of water bearing strata in bore holes which consists in determining the normal fluid level of a bore hole, supplying to the bore hole water of less saline concentration than the solution in a water bearing stratum, reducing the level of the resulting column of liquid in the bore hole to a point below the normal fluid level, so that inflow and diffusion from such water bearing stratum will establish a zone of relatively high saline concentration in the column of liquid opposite such stratum, and determining the location of such zone by measuring the saline concentration of the liquid at different levels in the liquid column, in situ while preventing fouling of the concentration measuring means by oily material present in said bore hole.

3. The method of determining the location of a water bearing stratum in a well which consists in introducing water of low saline concentration so as to displace the liquid in a portion of the well and produce a body of water of low saline concentration in such portion of the well, with the result that there is produced opposite any salt water bearing stratum in such portion of the well, by diffusion of salt water from such stratum into such body of water, a zone of higher saline concentration than will exist in such body of water at parts of the well which are not opposite to a water bearing stratum, and measuring the saline concentration in such body of water in situ at different heights in the well so as to determine the position of such water bearing stratum while preventing fouling of the measuring means by oily material in said bore hole.

4. The method of locating the position of water bearing strata in bore holes which consists in producing within the bore hole a column of liquid presenting sharp difference in saline concentration between the liquid opposite the water bearing strata and the rest of the liquid in the bore hole and measuring the electrical conductivity of different parts of the column of liquid in situ in the bore hole to determine the location of the water bearing strata, while preventing contact of oily material in the bore hole with the electrodes used in said measuring operation.

5. The method of determining the location of water bearing strata in bore holes which consists in supplying to the bore hole water presenting less saline concentration than the solution in the water bearing strata so that diffusion from the water bearing strata will establish a zone of relatively high saline concentration in the column of liquid in the bore hole opposite a water bearing stratum and then measuring the electrical conductivity of the liquid in situ at different parts of said column to determine the location of any part thereof presenting such relatively high saline concentration while said liquid carries in its upper part, substantial quantities of oily material.

6. The method of determining the location of water bearing strata in bore holes which consists in producing within the bore hole a column of liquid presenting relatively high saline concentration at a part thereof adjacent to a water bearing stratum, then causing an electrode means to traverse the column throughout the height for which determination is to be made, and measuring electrical resistance of the liquid exposed to said electrode means to determine the position of such part having relatively high saline concentration while preventing fouling of the said electrode means with oily material during the whole of the period of contact thereof with the liquid in the bore hole.

7. The method of determining the location of water bearing strata in bore holes for oil or gas production which consists in producing a column of liquid in the bore hole, said column presenting relatively high saline concentration opposite a water bearing stratum and relatively low saline concentration at other parts thereof and measuring the electrical conductivity at a series of points in the depth of such bore hole while preventing any substantial fouling of the electrodes during such treatment.

8. The method of determining the location of a water bearing stratum in a bore hole in which salt water is present from such stratum which comprises introducing into the bore hole at the lower portion thereof, purer water in quantity sufficient to displace the salt water in the bore hole by such purer water, then making successive measurements of saline concentration in situ at different levels in the resulting water column remaining in the bore hole while preventing any substantial fouling of the measuring means by oily material present in said bore hole.

9. A method of determining the location of water-bearing strata in bore holes which holes contain oily material, and which holes enter oil-bearing sand at one point at least, such process comprising passing water of a degree of purity widely different from the saline water normally present in the bore hole, into the bottom of such bore hole, until the bulk of the original saline water is substantially displaced therefrom, lowering the liquid level to below the normal fluid level of the bore hole, and passing electrode means for measuring conductively through oily material on the top of liquid in said hole, into the aqueous liquid therein and measuring the electrical conductivity at many points in the height of the column of liquid to determine zones of relatively high conductivity, opposite original water-bearing strata while preventing any substantial fouling of the electrode means with oily material at any stage of the process.

10. Method of locating point of ingress of native aqueous fluid into bore holes for oil production, consisting in determining normal fluid level of the bore hole, displacing all native fluid in the bore hole by fresh water, bringing the column of fresh water to the normal fluid level to balance the pressure of native fluid in the sands adjacent to the bore hole, then reducing the head of the column of fresh water so that native fluid can enter the bore hole and making electrical conductivity measurements of this column to determine where the native fluid enters maintaining the electrical measuring means operative in the presence of mineral oil and preventing grounds in the measuring circuit.

In testimony whereof I have hereunto subscribed my name this 22nd day of March 1924.

FREDERICK W. HUBER.